United States Patent
Haun et al.

(10) Patent No.: US 10,286,543 B2
(45) Date of Patent: May 14, 2019

(54) TRUCK TOOLBOXES AND METHODS OF MAKING AND USING THE SAME

(71) Applicants: Christopher Elliott Haun, Ormond Beach, FL (US); James Gregory Hitson, Port Orange, FL (US)

(72) Inventors: Christopher Elliott Haun, Ormond Beach, FL (US); James Gregory Hitson, Port Orange, FL (US)

( * ) Notice: Subject to any disclaimer, the term of this patent is extended or adjusted under 35 U.S.C. 154(b) by 81 days.

(21) Appl. No.: 15/358,443

(22) Filed: Nov. 22, 2016

(65) Prior Publication Data

US 2017/0144296 A1 May 25, 2017

Related U.S. Application Data

(60) Provisional application No. 62/259,409, filed on Nov. 24, 2015.

(51) Int. Cl.
| | |
|---|---|
| *B25H 5/00* | (2006.01) |
| *B60R 9/06* | (2006.01) |
| *A61J 1/00* | (2006.01) |
| *B25H 3/02* | (2006.01) |
| *B60R 11/06* | (2006.01) |
| *A61J 1/03* | (2006.01) |

(52) U.S. Cl.
CPC ............. *B25H 5/00* (2013.01); *A61J 1/00* (2013.01); *A61J 1/03* (2013.01); *B25H 3/022* (2013.01); *B60R 9/06* (2013.01); *B60R 11/06* (2013.01)

(58) Field of Classification Search
CPC .................................. B60R 9/06; B25H 5/00

USPC .......................................................... 224/404
See application file for complete search history.

(56) References Cited

U.S. PATENT DOCUMENTS

| | | | | |
|---|---|---|---|---|
| 5,685,467 | A * | 11/1997 | Niemi ...................... | B60R 9/00 220/23.83 |
| 5,848,744 | A * | 12/1998 | Dischner ............ | B60H 1/00014 224/404 |
| 5,893,599 | A * | 4/1999 | Strohfeldt ................. | B60R 9/00 224/404 |
| 5,924,615 | A * | 7/1999 | McGarrah .................. | B60R 9/00 220/482 |
| 6,554,169 | B1 * | 4/2003 | Furlong .................... | B60R 9/00 224/404 |
| 7,464,978 | B1 * | 12/2008 | Meeks ...................... | B25H 1/00 108/44 |
| D626,062 | S | 10/2010 | Giddens | |
| D659,074 | S | 5/2012 | Read et al. | |
| D679,906 | S | 4/2013 | Gros | |
| D717,721 | S | 11/2014 | Guaresimo et al. | |
| D720,680 | S | 1/2015 | Vitoorapakorn et al. | |
| 8,925,777 | B1 * | 1/2015 | Casucci ................. | B60R 9/065 224/404 |
| 9,156,412 | B1 | 10/2015 | Calvert | |
| D755,707 | S | 5/2016 | Roach et al. | |
| 2004/0080248 | A1 | 4/2004 | Klusmeier | |
| 2006/0091689 | A1 | 5/2006 | Wilding | |
| 2012/0085800 | A1 * | 4/2012 | Maimin .................. | B60J 7/141 224/404 |

* cited by examiner

*Primary Examiner* — Derek J Battisti
(74) *Attorney, Agent, or Firm* — Withers & Keys, LLC

(57) ABSTRACT

Truck toolboxes are disclosed. Methods of making and using truck toolboxes are further disclosed.

13 Claims, 5 Drawing Sheets

TRUCK TOOLBOXES AND METHODS OF MAKING AND USING THE SAME

CROSS-REFERENCE TO RELATED APPLICATIONS

This patent application claims the benefit of priority to U.S. Provisional Patent Application Ser. No. 62/259,409 filed on Nov. 24, 2015 and entitled "TRUCK TOOLBOXES AND METHODS OF MAKING AND USING THE SAME," the subject matter of which is hereby incorporated by reference in its entirety.

FIELD OF THE INVENTION

This invention generally relates to truck toolboxes. This invention also relates to methods of making truck toolboxes, as well as methods of using truck toolboxes.

BACKGROUND

Efforts continue to further develop truck toolboxes.

SUMMARY OF THE INVENTION

The present invention is directed to truck toolboxes. In one exemplary embodiment, the truck toolbox comprises: (I) a toolbox housing comprising: (a) a toolbox housing lower surface comprising a main body lower surface and outer edge lower surfaces on opposite ends of said main body lower surface, said outer edge lower surfaces being sized and configured to rest along upper edges of a truck bed with said main body lower surface extending into the truck bed; (b) one or more toolbox housing outer side surfaces integrally connected to said main body lower surface so as to form a toolbox housing outer surface that surrounds and encompasses a toolbox housing volume; and (c) two or more adjacent storage compartments integrally connected to one another and positioned within said toolbox housing, said two or more adjacent storage compartments comprising: (i) at least one cooler compartment positioned over said main body lower surface; (ii) a cooler lid for each cooler compartment; and (iii) at least one tool compartment positioned over said main body lower surface; and (II) a toolbox lid, said toolbox lid, when in a closed position, at least partially covering each of (i) said at least one cooler compartment, (ii) said cooler lid for each cooler compartment, and (iii) said at least one tool compartment.

The present invention is further directed to truck toolboxes in combination with one or more of the following: ice, bottled beverages, canned beverages, etc.

The present invention is also directed to methods of making truck toolboxes. In one exemplary embodiment, the method of making a truck toolbox of the present invention comprises: (I) thermoforming a toolbox housing, the toolbox housing comprising: (a) a toolbox housing lower surface comprising a main body lower surface and outer edge lower surfaces on opposite ends of the main body lower surface, the outer edge lower surfaces being sized and configured to rest along upper edges of a truck bed with the main body lower surface extending into the truck bed; (b) one or more toolbox housing outer side surfaces integrally connected to the main body lower surface so as to form a toolbox housing outer surface that surrounds and encompasses a toolbox housing volume; and (c) two or more adjacent storage compartments integrally connected to one another and positioned within the toolbox housing, the two or more adjacent storage compartments comprising: (i) at least one cooler compartment positioned over the main body lower surface; (ii) a cooler lid for each cooler compartment; and (iii) at least one tool compartment positioned over the main body lower surface; (II) thermoforming a toolbox lid, the toolbox lid, when attached to the toolbox housing and in a closed position, at least partially covering each of (i) the least one cooler compartment, (ii) the cooler lid for each cooler compartment, and (iii) the at least one tool compartment; thermoforming each cooler lid; and connecting the toolbox lid and each cooler lid to the toolbox housing.

The present invention is even further directed to methods of using truck toolboxes. In one exemplary embodiment, the method of using a truck toolbox comprises one or more of the following steps: placing ice within the at least one cooler compartment of the toolbox; placing one or more items of food within the at least one cooler compartment of the toolbox; placing one or more beverages within the at least one cooler compartment of the toolbox; placing one or more medicines within the at least one cooler compartment of the toolbox; opening the toolbox lid by lifting a toolbox lid front edge of the toolbox lid; and opening the cooler lid of at least one cooler compartment by lifting a cooler lid front edge of the cooler lid, the cooler lid front edge of the cooler lid being substantially parallel with the toolbox lid front edge of the toolbox lid.

These and other features and advantages of the present invention will become apparent after a review of the following detailed description of the disclosed embodiments and the appended claims.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

The present invention is directed to truck toolboxes such as exemplary truck toolbox 10 shown in FIGS. 1-5. The present invention is further directed to methods of making and using truck toolboxes such as exemplary truck toolbox 10 shown in FIGS. 1-5.

Figure 1:
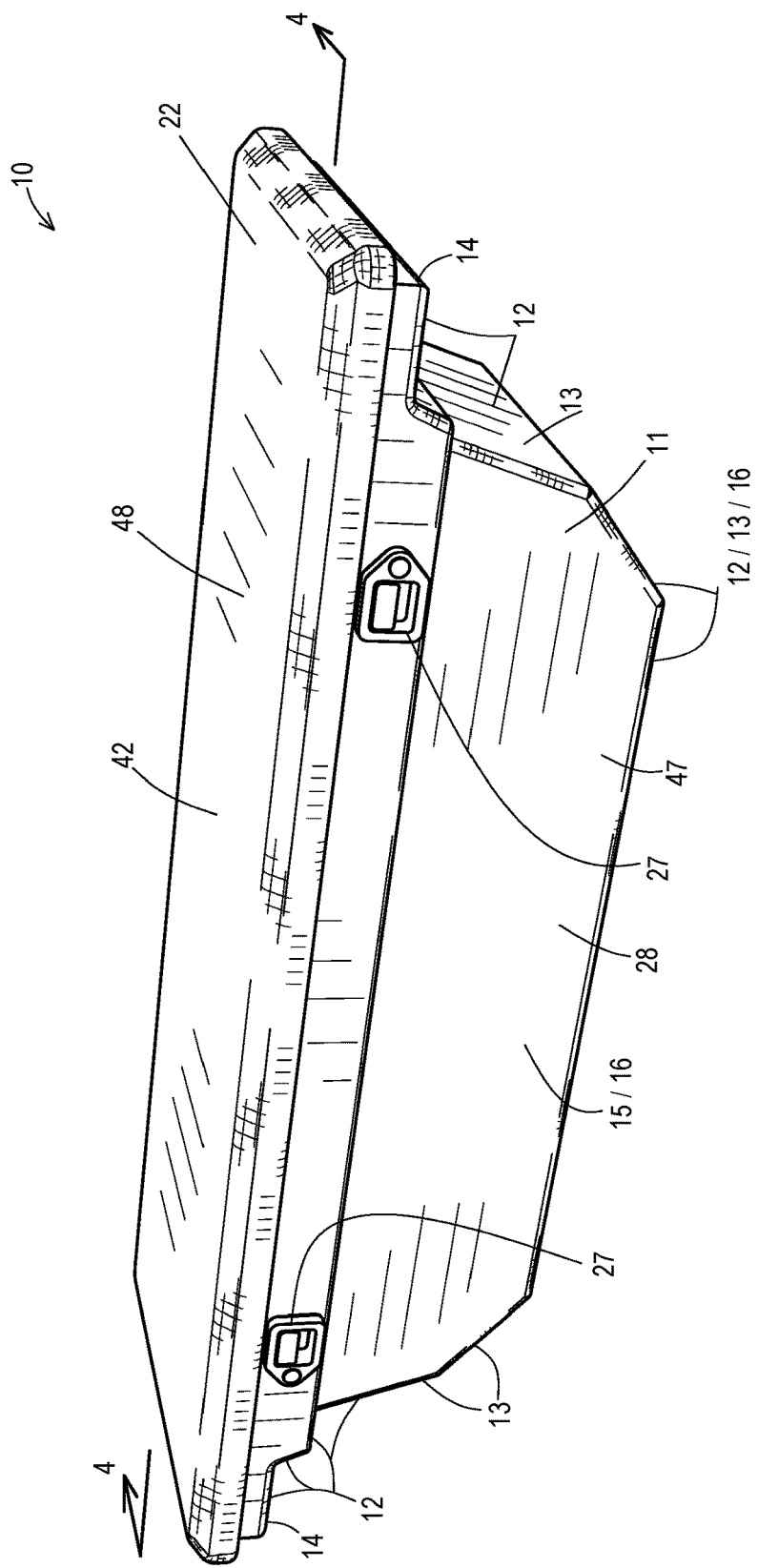
FIG. 1 is a perspective view of an exemplary truck toolbox of the present invention.
Figure 2:
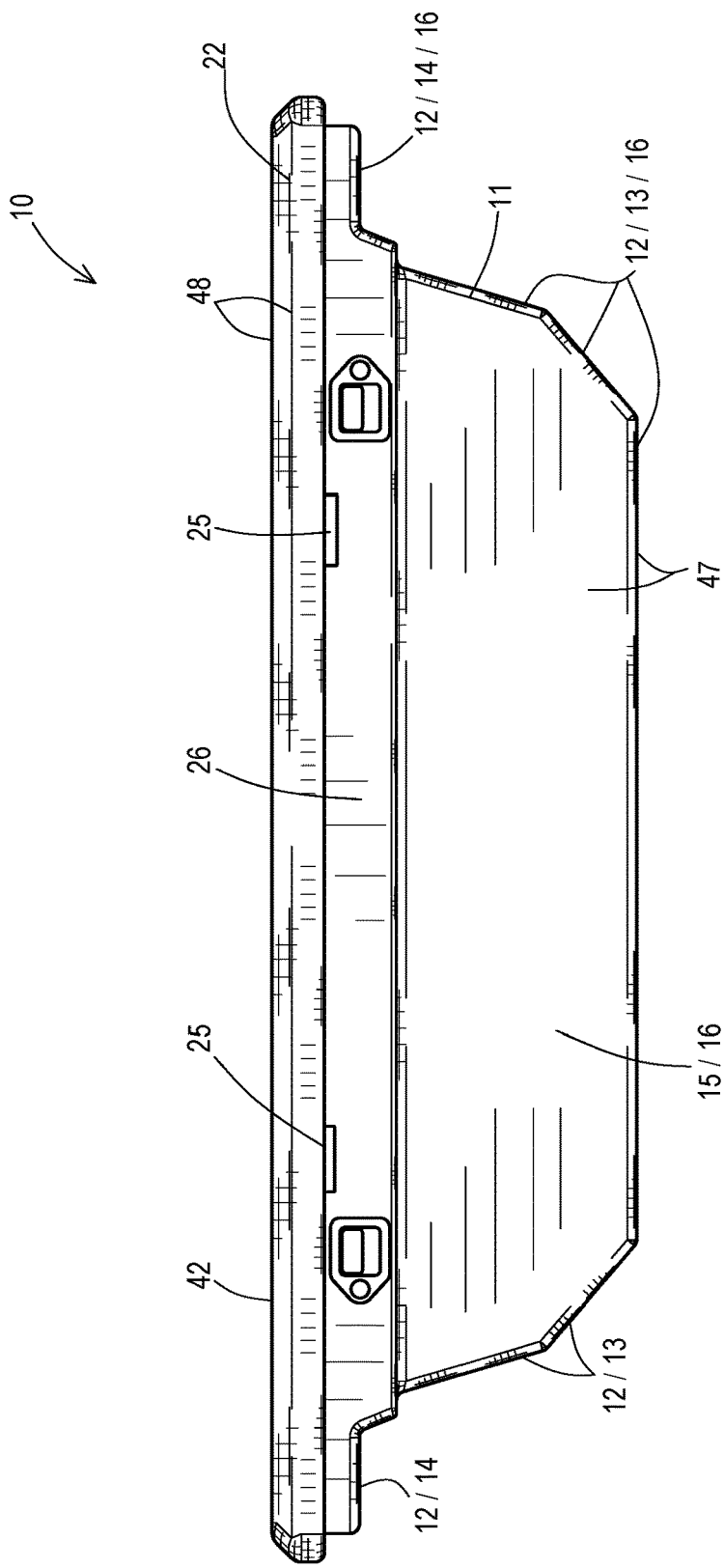
FIG. 2 is a rear view of the exemplary truck toolbox shown in FIG. 1.

As shown in FIG. 1, exemplary truck toolbox 10 comprises: (I) a toolbox housing 11 comprising: (a) a toolbox housing lower surface 12 comprising a main body lower surface 13 and outer edge lower surfaces 14 on opposite ends of said main body lower surface 13, said outer edge lower surfaces 14 being sized and configured to rest along upper edges of a truck bed (not shown) with said main body lower surface 13 extending into the truck bed (not shown); (b) one or more toolbox housing outer side surfaces 15 integrally connected to said main body lower surface 13 so as to form a toolbox housing outer surface 16 that surrounds and encompasses a toolbox housing volume 17; and (c) two or more adjacent storage compartments 18 integrally connected to one another and positioned within said toolbox housing 11, said two or more adjacent storage compartments 18 comprising: (i) at least one cooler compartment 19 positioned over said main body lower surface 13; (ii) a cooler lid 20 for each cooler compartment 19; and (iii) at least one tool compartment 21 positioned over said main body lower surface 13; and (II) a toolbox lid 22, said toolbox lid 22, when in a closed position (as shown in FIG. 1), at least partially covering each of (i) said at least one cooler compartment 19, (ii) said cooler lid 20 for each cooler compartment 19, and (iii) said at least one tool compartment 21.

The present invention is further directed to methods of making truck toolboxes such as exemplary truck toolbox 10. As discussed above, in one exemplary embodiment, the method of making a truck toolbox 10 of the present invention comprises (I) thermoforming a toolbox housing 11 comprising: (a) a toolbox housing lower surface 12 comprising a main body lower surface 13 and outer edge lower surfaces 14 on opposite ends of said main body lower surface 13, said outer edge lower surfaces 14 being sized and configured to rest along upper edges of a truck bed (not shown) with said main body lower surface 13 extending into the truck bed (not shown); (b) one or more toolbox housing outer side surfaces 15 integrally connected to said main body lower surface 13 so as to form a toolbox housing outer surface 16 that surrounds and encompasses a toolbox housing volume 17; and (c) two or more adjacent storage compartments 18 integrally connected to one another and positioned within said toolbox housing 11, said two or more adjacent storage compartments 18 comprising: (i) at least one cooler compartment 19 positioned over said main body lower surface 13; (ii) a cooler lid 20 for each cooler compartment 19; and (iii) at least one tool compartment 21 positioned over said main body lower surface 13; (II) thermoforming a toolbox lid 22, the toolbox lid 22, when attached to the toolbox housing 11 and in a closed position (as shown in FIG. 1), at least partially covering each of (i) the least one cooler compartment 19, (ii) the cooler lid 20 for each cooler compartment 19, and (iii) the at least one tool compartment 21; thermoforming each cooler lid 20; and connecting the toolbox lid 22 and each cooler lid 20 to the toolbox housing 11.

Methods of making truck toolbox 10 of the present invention may further comprise one or more additional steps including, but not limited to, coating an outer surface 16 of the toolbox housing 11 and/or toolbox lid 22 with a paint; coating an inner surface 49 of the toolbox housing 11 and/or toolbox lid 22 with a gel coat material; or any combination thereof.

The present invention is even further directed to methods of using truck toolboxes such as exemplary truck toolbox 10. As discussed above, in one exemplary embodiment, the method of using a truck toolbox 10 comprises one or more of the following steps: placing ice (not shown) within the at least one cooler compartment 19 of the toolbox 10; placing one or more items of food (not shown) within the at least one cooler compartment 19 of the toolbox 10; placing one or more beverages (not shown) within the at least one cooler compartment 19 of the toolbox 10; placing one or more medicines (not shown) within the at least one cooler compartment 19 of the toolbox 10; opening the toolbox lid 22 by lifting a toolbox lid front edge 44 of the toolbox lid 22; and opening the cooler lid 20 of at least one cooler compartment 19 by lifting a cooler lid front edge 43 of the cooler lid 20, the cooler lid front edge 43 of the cooler lid 20 being substantially parallel with the toolbox lid front edge 44 of the toolbox lid 22.

Additional Embodiments:

Truck Toolboxes

1. A truck toolbox 10 comprising: (I) a toolbox housing 11 comprising: (a) a toolbox housing lower surface 12 comprising a main body lower surface 13 and outer edge lower surfaces 14 on opposite ends of said main body lower surface 13, said outer edge lower surfaces 14 being sized and configured to rest along upper edges of a truck bed (not shown) with said main body lower surface 13 extending into the truck bed (not shown); (b) one or more toolbox housing outer side surfaces 15 integrally connected to said main body lower surface 13 so as to form a toolbox housing outer surface 16 that surrounds and encompasses a toolbox housing volume 17; and (c) two or more adjacent storage compartments 18 integrally connected to one another and positioned within said toolbox housing 11, said two or more adjacent storage compartments 18 comprising: (i) at least one cooler compartment 19 positioned over said main body lower surface 13; (ii) a cooler lid 20 for each cooler compartment 19; and (iii) at least one tool compartment 21 positioned over said main body lower surface 13; and (II) a toolbox lid 22, said toolbox lid 22, when in a closed position (as shown in FIG. 1), at least partially covering each of (i) said at least one cooler compartment 19, (ii) said cooler lid 20 for each cooler compartment 19, and (iii) said at least one tool compartment 21.

2. The truck toolbox 10 of embodiment 1, wherein said toolbox lid 22, when in a closed position (as shown in FIG. 1), completely covers each of (i) said at least one cooler compartment 19, (ii) said cooler lid 20 for each cooler compartment 19, and (iii) said at least one tool compartment 21.

3. The truck toolbox 10 of embodiment 1 or 2, wherein said at least one cooler compartment 19 shares a compartment dividing wall assembly 23 with said at least one tool compartment 21.

4. The truck toolbox 10 of embodiment 3, wherein said compartment dividing wall assembly 23 comprises a single compartment insulated dividing wall 24. In some embodiments, the compartment dividing wall assembly 23 comprises a single compartment insulated dividing wall 24 that is double insulated (i.e., has a wall thickness that is 1.5 to 2.5 times thicker than other walls of the truck toolbox 10 that are not in contact with said at least one cooler compartment 19). For example, the single compartment insulated dividing wall 24 may comprise, in combination, a #5 density DIVINYCELL H-80 foam sheet (commercially available from DIAB Inc. (DeSota, Tex.)) attached to a #4 density LAST-A-FOAM™ foam sheet (commercially available from General Plastics (Tacoma, Wash.)), with the #4 density LAST-A-FOAM™ 1.5 inch thick foam sheet adjacent to said at least one cooler compartment 19.

5. The truck toolbox 10 of any one of embodiments 1 to 4, wherein said at least one cooler compartment 19 represents less than half of said toolbox housing volume 17, and said at least one tool compartment 21 represents more than half of said toolbox housing volume 17.

6. The truck toolbox 10 of any one of embodiments 1 to 5, wherein said two or more adjacent storage compartments 18 comprises: a single cooler compartment 19 positioned over said main body lower surface 13; a single cooler lid 20; and a single tool compartment 21 positioned over said main body lower surface 13.

7. The truck toolbox 10 of any one of embodiments 1 to 6, further comprising one or more outer edge tool compartments 24 positioned over said outer edge lower surfaces 14.

8. The truck toolbox 10 of any one of embodiments 1 to 7, further comprising at least one outer edge tool compartment 24 positioned over each of said outer edge lower surfaces 14.

9. The truck toolbox 10 of any one of embodiments 1 to 8, further comprising at least one toolbox lid connector 25 positioned along a rear outer surface 26 of said toolbox housing 11, each toolbox lid connector 25 connecting (i) said toolbox lid 22 to (ii) said toolbox housing outer surface 16.

10. The truck toolbox 10 of any one of embodiments 1 to 9, further comprising at least one toolbox lid fastener 27 positioned along a front outer surface 28 of said toolbox housing 11, each toolbox lid fastener 27 being configured to temporarily connect (i) said toolbox lid 22 to (ii) said toolbox housing outer surface 16.

Figure 3:
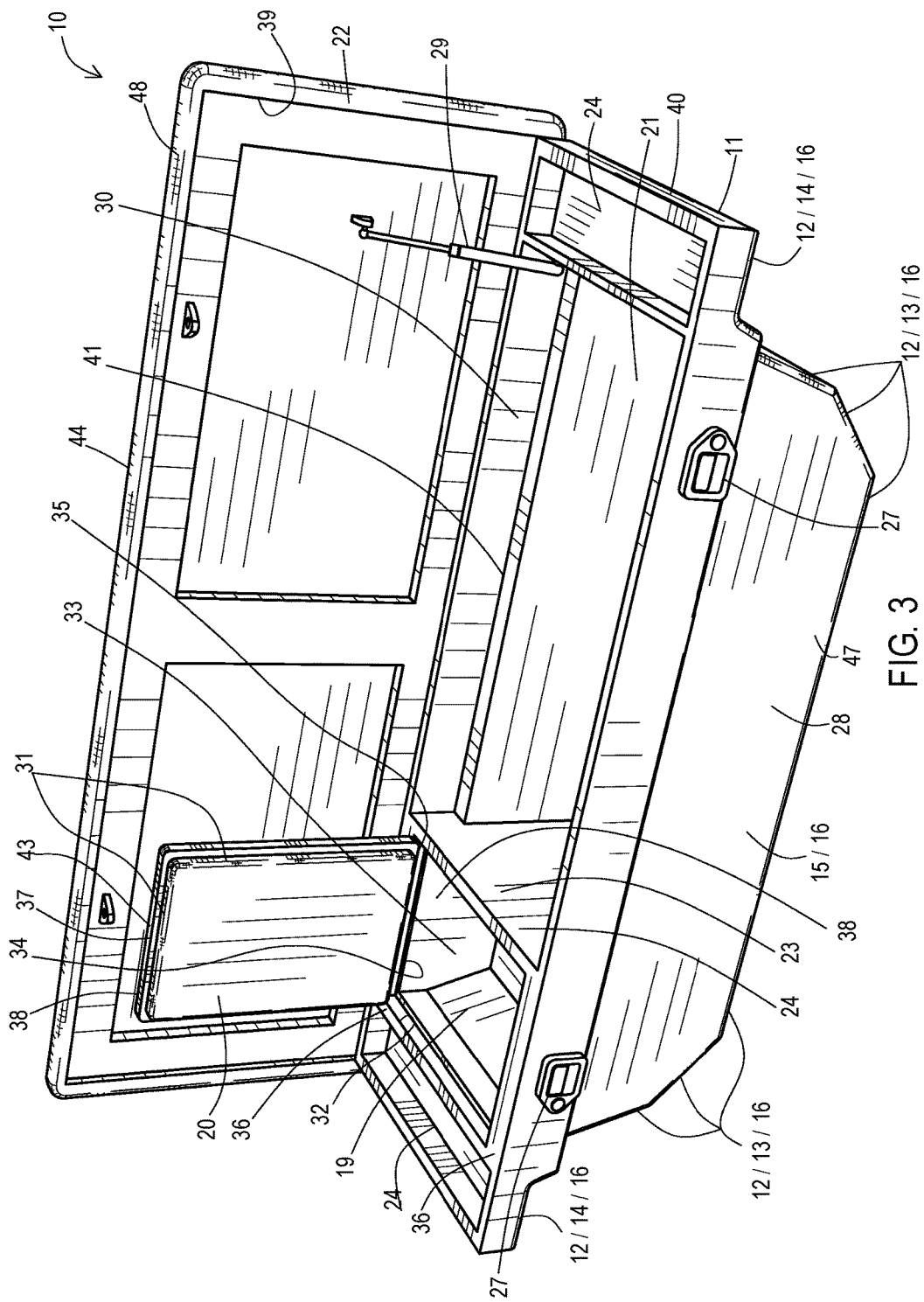
FIG. 3 is a perspective view of the exemplary truck toolbox shown in FIG. 1 with both the primary toolbox lid and the secondary cooler lid in open positions.
Figure 4:
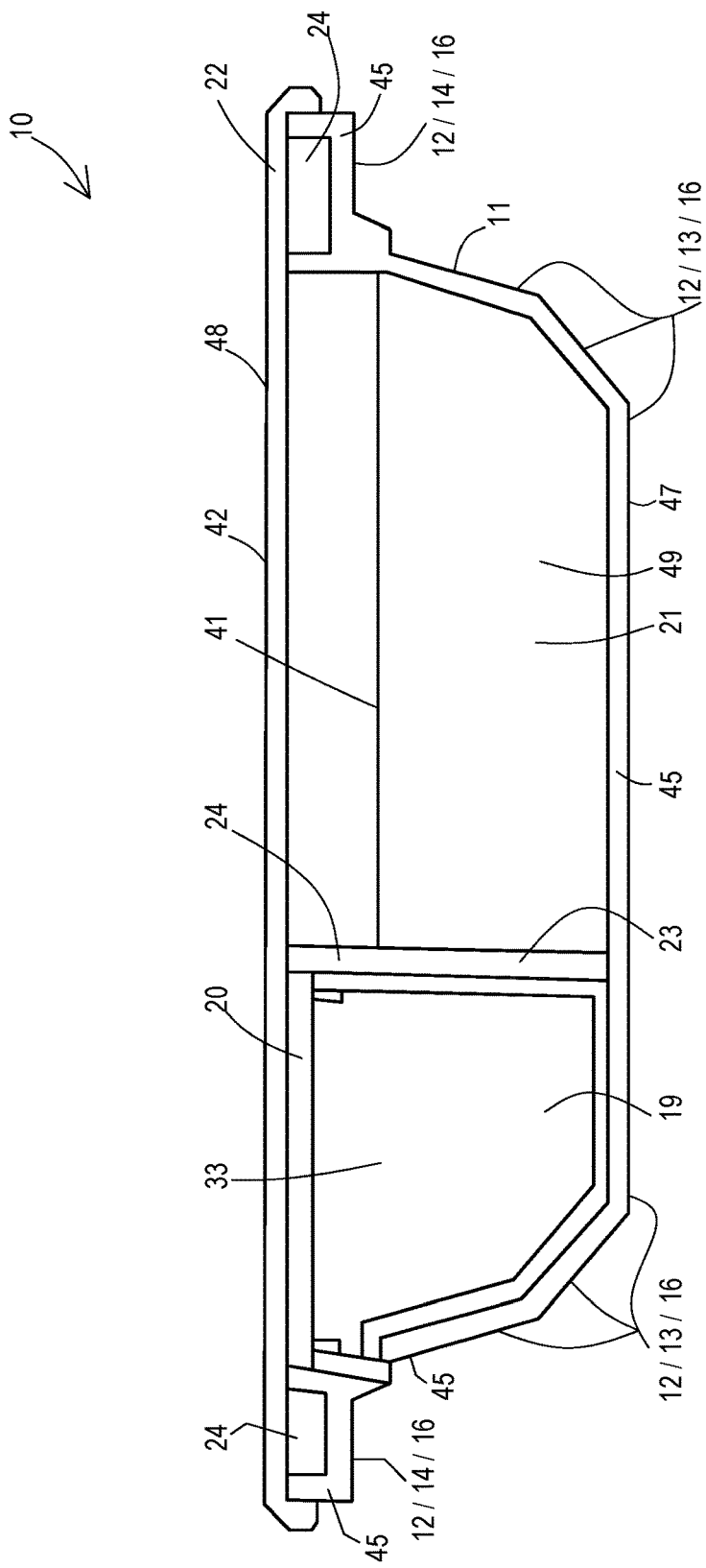
FIG. 4 is a cross-sectional view of the exemplary truck toolbox shown in FIG. 1 as viewed along line 4-4 shown in FIG. 1.
Figure 5:
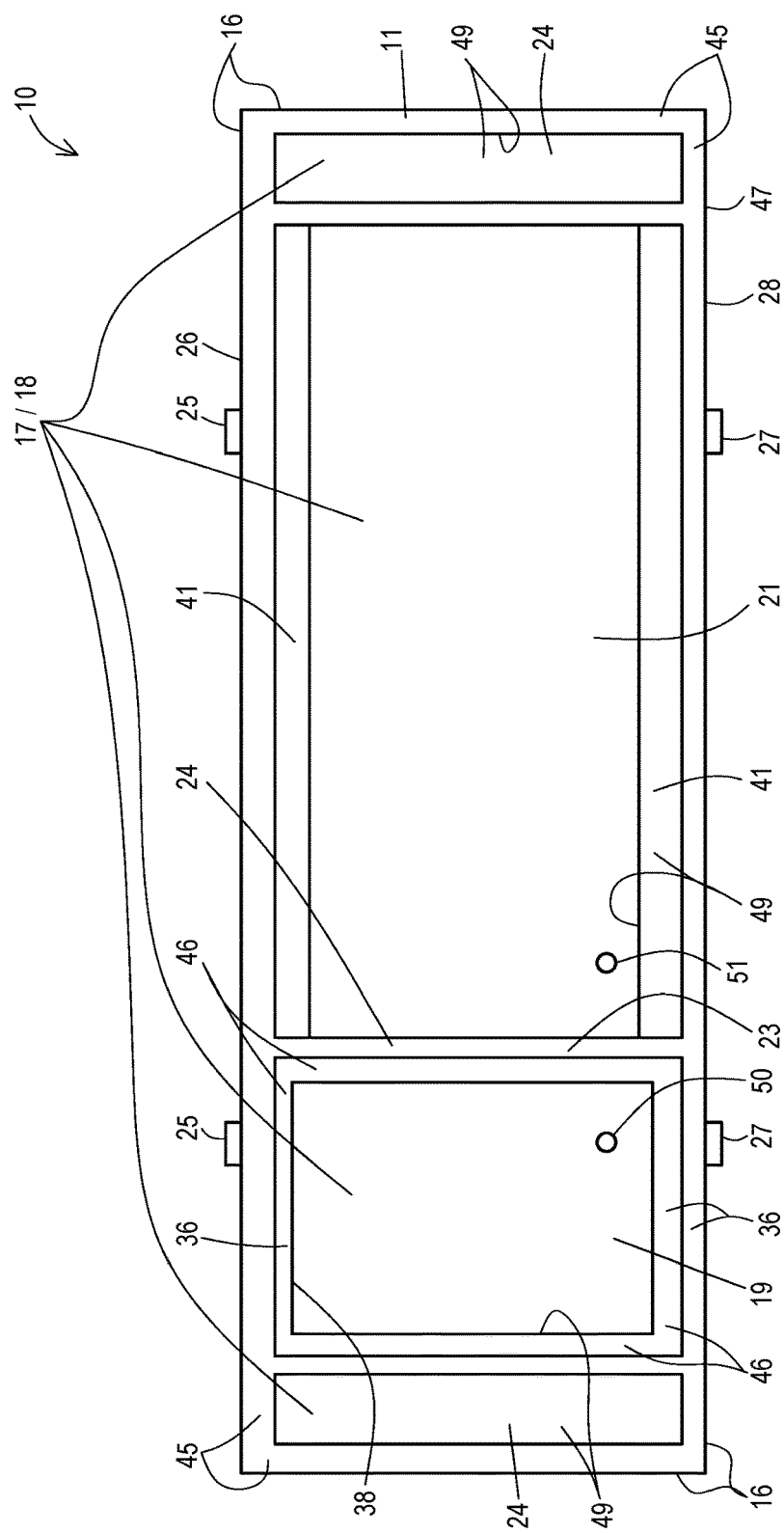
FIG. 5 is a top view of the exemplary truck toolbox shown in FIG. 3 with the toolbox lid and the cooler lid removed.

11. The truck toolbox 10 of any one of embodiments 1 to 10, further comprising at least one toolbox lid stabilizer 29 (e.g., one or more gas shock locking mechanisms) positioned within said at least one tool compartment 21, each toolbox lid stabilizer 29 (a) being connected to (i) said toolbox lid 22 and (ii) an inner wall 30 of said at least one tool compartment 21, and (b) temporarily locking said toolbox lid 22 in an open position (as shown in FIG. 3).

12. The truck toolbox 10 of any one of embodiments 1 to 11, wherein said one or more toolbox outer side surfaces 16 comprises (i) a front toolbox outer side surface 28, and (ii) a rear toolbox outer side surface 26 opposite said front toolbox outer side surface 28.

13. The truck toolbox 10 of any one of embodiments 1 to 12, wherein said main body lower surface 13 forms two opposite toolbox outer side surfaces 16 connecting a front toolbox outer side surface 28 to a rear toolbox outer side surface 26.

14. The truck toolbox 10 of any one of embodiments 1 to 13, wherein each cooler lid 20 comprises a cooler lid interconnecting component 31, each cooler compartment 19 comprises a cooler compartment interconnecting component 32, and said cooler lid interconnecting component 31 connects with said cooler compartment interconnecting component 32 so as to form an insulated cooler volume 33.

15. The truck toolbox 10 of any one of embodiments 1 to 14, further comprising at least one cooler lid connector 34 positioned along a rear surface 35 of each cooler lid 20, each cooler lid connector 34 connecting (i) said cooler lid 20 to (ii) an inner toolbox surface 36.

16. The truck toolbox 10 of any one of embodiments 1 to 15, further comprising at least one cooler lid fastener 37 positioned along a front surface 38 of each cooler lid 20, each cooler lid fastener 37 being configured to temporarily connect (i) said cooler lid 20 to (ii) an inner toolbox surface 36.

17. The truck toolbox 10 of any one of embodiments 1 to 16, further comprising at least one cooler lid stabilizer (not shown) positioned within said at least one cooler compartment 19, each cooler lid stabilizer (not shown) (a) being connected to (i) said cooler lid 20 and (ii) an inner wall 38 of said at least one cooler compartment 19, and (b) temporarily locking said cooler lid 20 in an open position (as shown in FIG. 3).

18. The truck toolbox 10 of any one of embodiments 14 to 17, wherein said insulated cooler volume 33 is capable of storing ice (not shown) for at least 3 days. Typically, the foam used to form said insulated cooler volume 33 has an "R value" of at least 8.0.

19. The truck toolbox 10 of any one of embodiments 1 to 18, wherein said toolbox lid 22 comprises a toolbox lid interconnecting component 39, said toolbox housing 11 comprising a toolbox housing interconnecting component 40, and said toolbox lid interconnecting component 39 connects with said toolbox housing interconnecting component 40 so as to form an insulated toolbox volume 17.

20. The truck toolbox 10 of any one of embodiments 1 to 19, further comprising at least one tray-supporting edge 41 positioned along an outer periphery of said at least one tool compartment 21. See, for example, exemplary tray-supporting edges 41 shown in FIGS. 3 and 5.

21. The truck toolbox 10 of any one of embodiments 1 to 20, further comprising a pair of tray-supporting edges 41 positioned along opposite sides of an outer periphery of said at least one tool compartment 21. See, for example, exemplary tray-supporting edges 41 shown in FIG. 5.

22. The truck toolbox 10 of any one of embodiments 1 to 20, further comprising one or more removable tool compartment trays (not shown), each removable tool compartment tray being sized and configured to rest along one or more tray-supporting edges 41 positioned along an outer periphery of said at least one tool compartment 21.

23. The truck toolbox 10 of any one of embodiments 1 to 22, wherein said toolbox lid 22 comprises a toolbox lid upper surface 42 having an overall rectangular shape.

24. The truck toolbox 10 of any one of embodiments 1 to 23, wherein said two or more adjacent storage compartments 18 have a combined storage volume of at least 3.0 cubic feet ($ft^3$). Typically, said two or more adjacent storage compartments 18 have a combined storage volume of from about 4.0 $ft^3$ to about 16.0 $ft^3$, more typically, from about 8.0 $ft^3$ to about 13.0 $ft^3$.

25. The truck toolbox 10 of any one of embodiments 1 to 24, wherein a cooler lid front edge 43 of each cooler lid 20 and a toolbox lid front edge 44 of said toolbox lid 22 is parallel with one another (i.e., facing the same direction).

26. The truck toolbox 10 of embodiment 25, wherein said cooler lid front edge 43 and said toolbox lid front edge 44 face the truck bed (not shown) and away from a truck cab (not shown).

27. The truck toolbox 10 of any one of embodiments 1 to 26, wherein outer toolbox housing walls 45 of said toolbox housing 11 (see, FIG. 5) comprise a toolbox housing outer wall structure comprising one or more layers of toolbox housing outer wall material, said one or more layers of toolbox housing outer wall material comprising a fiberglass-containing first foam material.

28. The truck toolbox 10 of embodiment 27, wherein said one or more layers of toolbox housing outer wall material comprise a fiberglass mat (not shown).

29. The truck toolbox 10 of embodiment 27 or 28, wherein said one or more layers of toolbox housing outer wall material comprise a fiberglass mat having a mat density of about 1.5 ounces per square foot ($oz/ft^2$). In some embodiments, the fiberglass mat comprises a 1.5 $oz/ft^2$ chopped strand mat from Owens Corning (Toledo, Ohio).

30. The truck toolbox 10 of any one of embodiments 27 to 29, wherein said first foam material comprises a polyvinyl chloride foam.
31. The truck toolbox 10 of any one of embodiments 27 to 30, wherein said first foam material comprises a polyvinyl chloride foam having a foam density of about 5.0 pounds/cubic feet (lb/ft$^3$) (e.g., DIVINYCELL H80 foam).
32. The truck toolbox 10 of any one of embodiments 1 to 31, wherein said toolbox lid 22 comprises a toolbox lid structure comprising one or more layers of toolbox lid material, said one or more layers of toolbox lid material comprising a fiberglass-containing first foam material.
33. The truck toolbox 10 of embodiment 32, wherein said one or more layers of toolbox lid material comprise a fiberglass mat (not shown).
34. The truck toolbox 10 of embodiment 32 or 33, wherein said one or more layers of toolbox lid material comprise a fiberglass mat having a mat density of about 1.5 oz/ft$^2$.
35. The truck toolbox 10 of any one of embodiments 32 to 34, wherein said first foam material comprises a polyvinyl chloride foam.
36. The truck toolbox 10 of any one of embodiments 32 to 35, wherein said first foam material comprises a polyvinyl chloride foam having a foam density of about 5.0 pounds/cubic feet (lb/ft$^3$) (e.g., DIVINYCELL H80 foam).
37. The truck toolbox 10 of any one of embodiments 1 to 36, wherein outer cooler compartment walls 46 surrounding said at least one cooler compartment 19 (see, FIG. 5) comprise a cooler compartment outer wall structure comprising one or more layers of cooler compartment outer wall material, said one or more layers of cooler compartment outer wall material comprising a fiberglass-containing second foam material.
38. The truck toolbox 10 of embodiment 37, wherein said one or more layers of cooler compartment outer wall material comprise a fiberglass mat (not shown).
39. The truck toolbox 10 of embodiment 37 or 38, wherein said one or more layers of cooler compartment outer wall material comprise a fiberglass mat having a mat density of about 1.5 oz/ft$^2$.
40. The truck toolbox 10 of any one of embodiments 37 to 39, wherein said second foam material comprises a polyvinyl chloride foam.
41. The truck toolbox 10 of any one of embodiments 37 to 40, wherein said second foam material comprises a polyvinyl chloride foam having a foam density of about 4.0 lb/ft$^3$ (e.g., LAST-A-FOAM™ foam sheet).
42. The truck toolbox 10 of any one of embodiments 1 to 41, wherein each cooler lid 20 comprises a cooler lid structure comprising one or more layers of cooler lid material, said one or more layers of cooler lid material comprising a fiberglass-containing second foam material.
43. The truck toolbox 10 of embodiment 42, wherein said one or more layers of cooler lid material comprise a fiberglass mat (not shown).
44. The truck toolbox 10 of embodiment 42 or 43, wherein said one or more layers of cooler lid material comprise a fiberglass mat having a mat density of about 1.5 oz/ft$^2$.
45. The truck toolbox 10 of any one of embodiments 42 to 44, wherein said second foam material comprises a polyvinyl chloride foam.
46. The truck toolbox 10 of any one of embodiments 42 to 45, wherein said second foam material comprises a polyvinyl chloride foam having a foam density of about 4.0 lb/ft$^3$ (e.g., LAST-A-FOAM™ foam sheet).
47. The truck toolbox 10 of any one of embodiments 27 to 46, wherein said one or more layers of toolbox housing outer wall material further comprises an outermost paint layer 47.
48. The truck toolbox 10 of any one of embodiments 32 to 47, wherein said one or more layers of toolbox lid material further comprises an outermost paint layer 48.
49. The truck toolbox 10 of embodiment 47 or 48, wherein said outmost paint layer 47/48 comprises a polyurethane paint (e.g., IMRON paint available from DuPont).
50. The truck toolbox 10 of any one of embodiments 1 to 49, wherein at least a portion of an inner surface 49 of said two or more adjacent storage compartments 18 comprising a polyester gel coat material.
51. The truck toolbox 10 of any one of embodiments 1 to 50, wherein each cooler compartment 19 of said at least one cooler compartment 19 positioned over said main body lower surface 13 further comprises a cooler compartment drain 50. See, FIG. 5.
52. The truck toolbox 10 of any one of embodiments 1 to 51, wherein each cooler compartment 19 of said at least one cooler compartment 19 positioned over said main body lower surface 13 further comprises a cooler compartment drain plug (not shown) (e.g., a ¾ inch diameter cooler compartment drain plug).
53. The truck toolbox 10 of any one of embodiments 1 to 52, wherein each tool compartment 21 of said at least one tool compartment 21 positioned over said main body lower surface 13 further comprises a tool compartment drain 51. See, FIG. 5.
54. The truck toolbox 10 of any one of embodiments 1 to 53, wherein each tool compartment 21 of said at least one tool compartment 21 positioned over said main body lower surface 13 further comprises a tool compartment drain plug (not shown) (e.g., a 1.0 inch diameter tool compartment drain plug).
55. The truck toolbox 10 of any one of embodiments 1 to 54, wherein any hardware, latches, hinges, and/or screws (e.g., toolbox lid connector 25 and toolbox lid fastener 27) used to form said toolbox 10 independently comprise marine grade stainless steel.
56. The truck toolbox 10 of any one of embodiments 1 to 55, further comprising ice (not shown) positioned within said at least one cooler compartment 19.
57. The truck toolbox 10 of any one of embodiments 1 to 56, further comprising one or more items of food (not shown) positioned within said at least one cooler compartment 19.
58. The truck toolbox 10 of any one of embodiments 1 to 57, further comprising one or more beverages (not shown) positioned within said at least one cooler compartment 19.
59. The truck toolbox 10 of any one of embodiments 1 to 58, further comprising one or more medicines (not shown) positioned within said at least one cooler compartment 19.

Methods of Making Truck Toolboxes

60. A method of making the truck toolbox 10 of any one of embodiments 1 to 55, said method comprising: thermoforming the toolbox housing 11 so as to form the two or more adjacent storage compartments 18 within the toolbox housing 11; thermoforming the toolbox lid 22; thermoforming each cooler lid 20; and connecting the toolbox lid 22 and each cooler lid 20 to the toolbox housing 11.

In one exemplary embodiment, the method of making the truck toolbox 10 of any one of embodiments 1 to 55 comprises the following steps. The walls of the main body housing 11 of the truck toolbox 10 are built using a #5 density DIVINYCELL H80 foam sheet and 3 layers of 1.5 oz/ft$^2$ chop strand fiberglass mat. All of the seams are bonded using CORBOND™ structural bonding compound, and then sanded and laminated together using 3 more layers of 1.5 oz/ft² chop strand fiberglass mat.

Once the toolbox housing 11 is built, at least one cooler compartment 19 is then framed out of #4 density LAST-A-FOAM™ 1.5 inch thick foam sheet, and laminated with 3 layers of 1.5 oz/ft² chop strand fiberglass mat along an inside and outside surface. The cooler lid 20 is constructed of DIVINYCELL H80 foam sheet with a layer of #4 density LAST-A-FOAM™ 1.5 inch thick foam sheet bonded and laminated to the bottom for more insulation. The lid 22 of the truck toolbox 10 is built out of DIVINYCELL H80 foam sheet scrimmed and scored, with all voids being filled with CORBOND™ structural bonding compound, and then laminated using 2 layers of 1.5 oz/ft² chop strand fiberglass mat and 2 layers of 1708 biaxial fiberglass mat (i.e., from Owens Corning) along a top and bottom surface.

The entire inside and out truck toolbox 10 was sanded with 80 grit sandpaper and painted with exterior gel coat. The lid 22 is attached to the toolbox truck toolbox 10 using a stainless piano hinge with stainless steel score screws. Then, a drain hole 50 is drilled out within the floor of the cooler compartment 19 and a 1" drain plug is installed therein. Then, a drain hole 51 is drilled out within the floor of an adjacent storage compartment 18 and a 1.5" drain plug is installed therein.

Methods of Using Truck Toolboxes

61. A method of using the truck toolbox 10 of any one of embodiments 1 to 55, said method comprising: placing ice within the at least one cooler compartment 19.
62. The method of embodiment 61, further comprising: placing one or more items of food within the at least one cooler compartment 19.
63. The method of embodiment 61 or 62, further comprising: placing one or more beverages within the at least one cooler compartment 19.
64. The method of any one of embodiments 61 to 63, further comprising: placing one or more medicines within the at least one cooler compartment 19.
65. The method of any one of embodiments 61 to 64, further comprising: opening the toolbox lid 22 by lifting a toolbox lid front edge 44 of the toolbox lid 22; and opening the cooler lid 20 of at least one cooler compartment 19 by lifting a cooler lid front edge 43 of the cooler lid 20, the cooler lid front edge 43 of the cooler lid 20 being substantially parallel with the toolbox lid front edge 44 of the toolbox lid 22.

It should be understood that although the above-described truck toolboxes and methods are described as "comprising" one or more components, features or steps, the above-described truck toolboxes and methods may "comprise," "consists of," or "consist essentially of" any of the above-described components and/or features and/or steps of the truck toolboxes and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a truck toolbox and/or method that "comprises" a list of elements (e.g., components or features or steps) is not necessarily limited to only those elements (or components or features or steps), but may include other elements (or components or features or steps) not expressly listed or inherent to the truck toolbox and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define truck toolboxes and/or methods that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described truck toolboxes and/or methods may comprise, consist essentially of, or consist of any of the herein-described components and features, as shown in the figures with or without any additional feature(s) not shown in the figures. In other words, in some embodiments, the truck toolboxes and/or methods of the present invention may have any additional feature(s) that is not specifically shown in the figures. In some embodiments, the truck toolboxes and/or methods of the present invention do not have any additional features other than those (i.e., some or all) shown in the figures, and such additional features, not shown in the figures, are specifically excluded from the truck toolboxes and/or methods.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Truck toolboxes, similar to exemplary truck toolbox 10 shown in FIGS. 1-5, were prepared using one or more molding (e.g., injection molding) and/or connecting steps.

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof. In addition, it is understood to be within the scope of the present invention that the disclosed and claimed fuel tanks and/or methods may be useful in other applications. Therefore, the scope of the invention may be broadened to include the use of the claimed and disclosed structures for such other applications.

What is claimed is:

1. A truck toolbox comprising: a toolbox housing comprising: a toolbox housing lower surface comprising a main body lower surface and outer edge lower surfaces on opposite ends of said main body lower surface, said outer edge lower surfaces being sized and configured to rest along upper edges of a truck bed with said main body lower surface extending into the truck bed; one or more toolbox housing outer side surfaces integrally connected to said main body lower surface so as to form a toolbox housing outer surface that surrounds and encompasses a toolbox housing volume; and two or more adjacent storage compartments within said toolbox housing volume, all of said two or more adjacent storage compartments being integrally connected to one another and positioned within said toolbox housing, said two or more adjacent storage compartments comprising: at least one cooler compartment positioned over said main body lower surface; a cooler lid for each cooler compartment; at least one tool compartment positioned over said main body lower surface; and two outer edge tool compartments positioned over said outer edge lower surfaces on opposite ends of said main body lower surface with one outer edge tool compartment being adjacent said at least one cooler compartment positioned over said main body lower surface and another outer edge tool compartment being adjacent said at least one tool compartment positioned over said main body lower surface; and a toolbox lid, said toolbox lid, when in a closed position, at least partially covering each of (i) said at least one cooler compartment, (ii) said cooler lid for each cooler compartment, and (iii) said at least one tool compartment, and (iv) said two outer edge tool compartments; wherein said at least one cooler compartment positioned over said main body lower surface shares a compartment dividing wall assembly with said at least one tool compartment positioned over said main body lower surface; and wherein said compartment dividing wall assembly comprises a single compartment insulated dividing wall, said single compartment insulated dividing wall having a wall thickness that is 1.5 to 2.5 times thicker than other walls of the truck toolbox that are not in contact with said at least one cooler compartment positioned over said main body lower surface.

2. The truck toolbox of claim 1, wherein said toolbox lid, when in a closed position, completely covers each of (i) said at least one cooler compartment, (ii) said cooler lid for each cooler compartment, (iii) said at least one tool compartment, and (iv) said two outer edge tool compartments.

3. The truck toolbox of claim 1, wherein said at least one cooler compartment positioned over said main body lower surface represents less than half of said toolbox housing volume, and said at least one tool compartment positioned over said main body lower surface represents more than half of said toolbox housing volume.

4. The truck toolbox of claim 1, wherein said two or more adjacent storage compartments comprises: a single cooler compartment positioned over said main body lower surface; a single cooler lid; a single tool compartment positioned over said main body lower surface; and said two outer edge tool compartments.

5. The truck toolbox of claim 1, wherein said toolbox further comprises (1) at least one cooler lid connector positioned along a rear surface of each cooler lid, each cooler lid connector connecting (i) said cooler lid to (ii) an inner toolbox surface; and (2) at least one cooler lid fastener positioned along a front surface of each cooler lid, each cooler lid fastener being configured to temporarily connect (i) said cooler lid to (ii) an inner toolbox surface.

6. The truck toolbox of claim 1, wherein said toolbox lid comprises a toolbox lid interconnecting component, said toolbox housing comprising a toolbox housing interconnecting component, and said toolbox lid interconnecting component connects with said toolbox housing interconnecting component so as to form an insulated toolbox volume.

7. The truck toolbox of claim 1, further comprising a pair of tray-supporting edges positioned (i) along opposite sides and within said at least one tool compartment positioned over said main body lower surface, and (ii) a distance below an upper edge of said at least one tool compartment positioned over said main body lower surface.

8. The truck toolbox of claim 7, further comprising one or more removable tool compartment trays, each removable tool compartment tray being sized and configured to rest along said pair of tray-supporting edges when said one or more removable tool compartment trays are positioned within said at least one tool compartment positioned over said main body lower surface.

9. The truck toolbox of claim 1, wherein (a) said toolbox lid comprises a toolbox lid upper surface having an overall rectangular shape; (b) said two or more adjacent storage compartments have a combined storage volume of at least 3.0 cubic feet ($ft^3$); and (c) a cooler lid front edge of each cooler lid and a toolbox lid front edge of said toolbox lid is parallel with one another and face a truck bed away from a truck cab.

10. The truck toolbox of claim 1, wherein (I) outer toolbox housing walls of said toolbox housing comprise a toolbox housing outer wall structure comprising one or more layers of toolbox housing outer wall material, said one or more layers of toolbox housing outer wall material comprising a fiberglass-containing first foam material, said first foam material comprising a polyvinyl chloride foam having a foam density of about 5.0 pounds/cubic feet ($lb/ft^3$); (II) said toolbox lid comprises a toolbox lid structure comprising one or more layers of toolbox lid material, said one or more layers of toolbox lid material comprising said fiberglass-containing first foam material; and (III) outer cooler compartment walls surrounding said at least one cooler compartment comprise a cooler compartment outer wall structure comprising one or more layers of cooler compartment outer wall material, said one or more layers of cooler compartment outer wall material comprising a fiberglass-containing second foam material, said second foam material comprises a polyvinyl chloride foam having a foam density of about 4.0 $lb/ft^3$.

11. The truck toolbox of claim 10, wherein each of (i) said one or more layers of toolbox housing outer wall material, (ii) said one or more layers of toolbox lid material, and (iii) said one or more layers of cooler compartment outer wall material further comprises a fiberglass mat having a mat density of about 1.5 $oz/ft^2$.

12. The truck toolbox of claim 1, further comprising (i) ice, (ii) one or more items of food, (iii) one or more beverages, (iv) one or more medicines, or (v) any combination of (i) to (iv) positioned within said at least one cooler compartment positioned over said main body lower surface.

13. The truck toolbox of claim 1, wherein each cooler compartment of said at least one cooler compartment positioned over said main body lower surface comprises a cooler compartment drain that extends from a given cooler compartment to said main body lower surface.

* * * * *